A. KOEHLER.
LENS MOUNT SAFETY LOCK.
APPLICATION FILED JAN. 30, 1919.
1,357,996.
Patented Nov. 9, 1920.
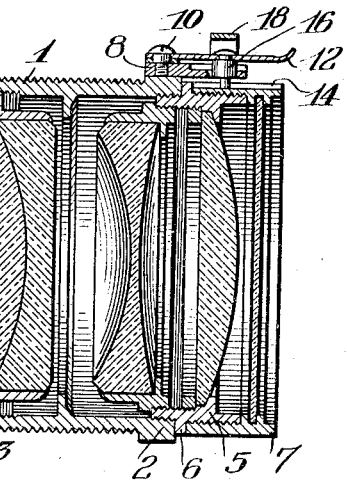
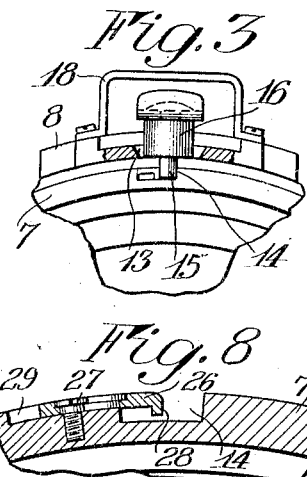
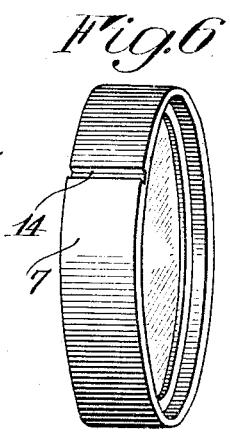
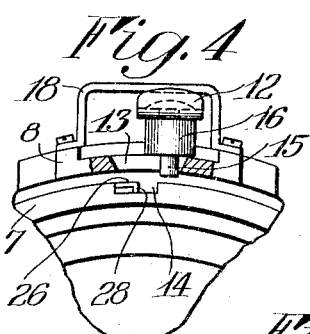
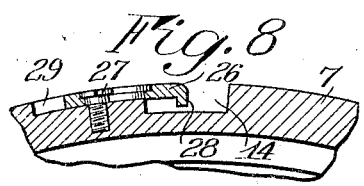
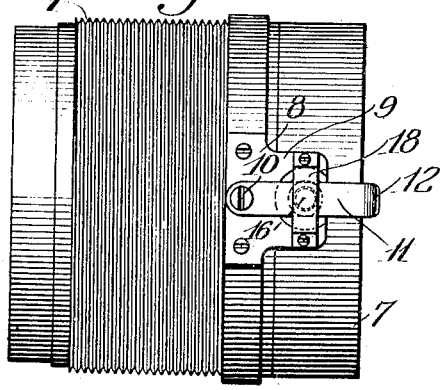
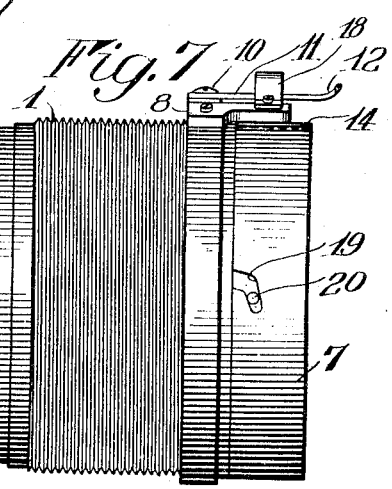
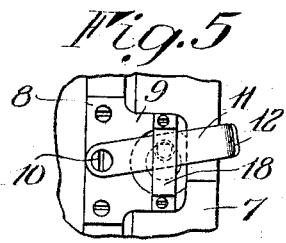
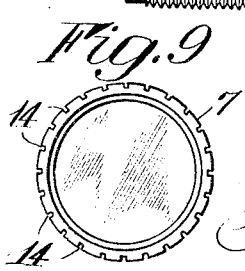
INVENTOR
August Koehler
BY
his ATTORNEYS

UNITED STATES PATENT OFFICE.

AUGUST KOEHLER, OF ROCHESTER, NEW YORK, ASSIGNOR TO BAUSCH & LOMB OPTICAL CO., OF ROCHESTER, NEW YORK, A CORPORATION OF NEW YORK.

LENS-MOUNT SAFETY-LOCK.

1,357,996.  Specification of Letters Patent.  Patented Nov. 9, 1920.

Application filed January 30, 1919. Serial No. 274,139.

*To all whom it may concern:*

Be it known that I, AUGUST KOEHLER, of Rochester, in the county of Monroe and State of New York, have invented certain new and useful Improvements in Lens-Mount Safety-Locks; and I do hereby declare the following to be a full, clear, and exact description of the same, reference being had to the accompanying drawings, forming a part of this specification, and to the reference-numerals marked thereon.

My invention relates to lens mounts and especially to lens mounts designed for use in photographic cameras. The object of my invention is to provide a safety lock for lens mounts which will prevent the objective and supplemental lenses, or either of them, from accidentally working loose and consequently being lost during use.

To these and other ends the invention resides in certain improvements and combinations of parts, all as will be hereinafter more fully described, the novel features being pointed out in the claims at the end of the specification.

In the drawings:

Figure 1 is a central longitudinal cross section of a photographic lens illustrating one application of my invention;

Fig. 2 is a side elevation of the same;

Fig. 3 is a fragmentary view showing my lock in engaging position;

Fig. 4 is a view similar to Fig. 3 showing the parts in unlocked position;

Fig. 5 is a fragmentary plan view showing the finger-piece moved to unlocking position;

Fig. 6 is a perspective view of a supplemental lens mount, showing a modified form of the invention;

Fig. 7 is a side elevation of a lens showing a modified form of supplemental lens mount with my improved locking devices applied thereto, the latter being shown in cross section;

Fig. 8 is an enlarged detail section of the locking devices on the supplemental lens mount; and Fig. 9 is a front elevation of a lens mount illustrating a further modification of my invention.

Similar reference characters throughout the several views indicate the same parts.

A lens tube 1 is exteriorly threaded for engagement with the lens board or lens support of a photographic camera. The lens tube is internally threaded at each end as at 2 and 3. The threads 3 at the rear end of the tube coöperate with an exteriorly threaded lens mount 4 which carries the rear combination of a photographic lens. The threads 2 at the front end of the lens tube coöperate with the exteriorly threaded rear end of a lens mount 5 which carries the front combination of the lens. The lens mount 5 is provided with an exterior flange or collar 6 which abuts against the front end of the lens tube when said lens mount is in position thereon. The front end of the lens mount 5 is also exteriorly threaded to coöperate with an exteriorly threaded supplemental lens mount 7 of a supplemental lens such as a ray filter. These parts may be of any usual or preferred construction.

Secured to the lens tube adjacent its forward end by means of screws or other suitable fastening means is a support for my locking devices in the form of a bracket or plate 8. The plate 8 projects forwardly at 9 and this forward projection overlies the forwardly projecting end of the front lens mount or the supplemental lens mount carried thereby. Mounted centrally of the plate 8 and pivoted on a shouldered screw 10 adjacent the rear end thereof is a spring finger or arm 11, which normally extends forwardly and is slightly upturned at its forward end at 12 to provide a finger-piece adjacent its forward end. The projection 9 of the bracket is provided with a central opening 13, the walls of which are inclined inwardly and downwardly. The front lens mount or supplemental lens mount carried thereby is provided with a longitudinal groove 14, with which a locking bolt 15 on the spring finger 11 is adapted to coöperate to prevent relative rotary movements between the lens tube and the supplementary lens mount or front lens mount. The locking bolt 15 is secured to the spring finger 11 by any suitable means as by riveting and has an enlarged shoulder 16 adjacent said spring finger. The shoulder 16 normally lies in the opening 13 of the bracket 8 and the locking bolt 15 projects into the groove 14 of the lens mount.

To insert or remove the front lens the spring finger is raised to withdraw the locking bolt from its groove; the spring finger is then moved laterally on its pivot until stopped by the engagement of the bolt 15 with the wall of the opening; the shoulder 16 will then engage the face of the bracket and hold the bolt disengaged from the slot against the action of its spring. In this position of the locking mechanism, the lens mount is free to be turned in either direction, and by a slight movement of the spring finger, the shoulder slips off the bracket and the bolt is again seated in its slot when turned to proper engaging position. It will be noted that the slot 14 extends longitudinally of the lens tube and may be engaged by the locking bolt whenever the mount is in a position in which the groove registers with the opening in the bracket.

Means are provided for preventing displacement of the spring finger 11 and the parts carried thereby. For this purpose, a sheet metal guard or bracket in the form of an inverted U-shaped strap 18 is provided. At its ends, the strap has outwardly bent ears by which it is secured by screws or otherwise to the projection 9 of the bracket 8. The strap extends over the spring finger 11 adjacent the opening 13 in the bracket and prevents excessive movements of the spring finger.

In the modification shown in Fig. 7 of the drawings, the supplemental lens mount is shown as secured to the front lens mount by means of a bayonet joint, comprising an angular slot 19 in the lens mount which coöperates with a pin 30 projecting from the front lens mount. When the supplemental lens mount is in position with the pin 20 near the end of the slot 19, the groove 14 is in position to be engaged by the locking bolt 15 and further rotary movements, such as would disengage the pin from the slot, are prevented.

It frequently happens that difficulty is experienced in bringing the slot 14 into position to be engaged by the locking bolt and yet screw the lens mount home or into a proper working position. To overcome this difficulty, I have devised the modification shown in Fig. 8 of the drawings. In this form, a recess or slot is made of considerable breadth so that the locking bolt may engage therewith through a considerable arc of the lens mount, and a plate 26 is adjustably mounted on the lens mount by means of a screw tapped into the slot in the plate and a screw tapped into the mount. The end 27 of the plate extends over the recess and is bent inwardly to provide a surface to engage with the locking bolt. In operation the supplemental lens is screwed home with the locking bolt extending into the recess. The adjustable locking plate 26 is then adjusted into contact with the bolt and secures the supplemental lens mount against displacement or working loose. When the plate has been adjusted with the thread of its mount, no further adjustment will be necessary when the mount is again used on the same lens.

It will be noted that when the locking bolt engages the slot in the supplemental lens mount, as shown in the drawing, both it and the front lens mount are securely locked against rotary movement or accidental displacement. This is very important in aerial photography where the camera is carried pointing downwardly, and the vibration caused by the machinery frequently causes the displacement or loss of the objective or supplemental lenses.

In the modified form of supplemental lens mount illustrated in Fig. 9, I have provided the mount with a plurality of uniformly spaced slots 14 in its periphery. Any convenient or preferred number of slots may be employed. In the form illustrated, I have shown twenty four spaced at angular distances of fifteen degrees from each other. In use the locking bolt engages that slot 14 in the lens mount with which it most nearly registers when the mount has been screwed to proper position.

I claim as my invention:

1. In a lens, the combination of a lens tube, a lens mount, a supplemental lens mount thereon and having a groove, a locking bolt adapted to coöperate with said groove to prevent relative rotation between the supplemental lens mount and the tube, and a resilient finger pivotally mounted on the lens tube on which the locking bolt is carried.

2. In a lens, the combination with a lens tube of a supplemental lens mount, a lens mount between said tube and supplemental mount and connecting means joining them but allowing disengagement of any one of them only by relative rotation thereof, a single locking device in coöperation with the lens tube and supplemental lens mount to prevent their relative rotation and adapted to prevent accidental removal of either the lens mount or the supplemental lens mount.

3. In a lens, the combination with a lens tube of a grooved lens mount screwed onto the lens tube, a bolt on the lens tube adapted to engage a groove in said lens mount to prevent the lens mount becoming accidentally unscrewed, said groove having adjusting means for one of its sides whereby its width may be changed to engage said bolt when the screw threads do not otherwise allow the lens mount and groove to be turned completely into engagement with the bolt.

4. In a lens, the combination of a lens tube, a grooved lens mount supported thereon, a locking bolt on the lens tube adapted to engage the groove and a plate on the lens mount projecting into the groove and adjustable into engagement with the locking bolt.

5. In a lens, the combination with a lens tube, of a grooved lens mount thereon, a locking bolt supported from said lens tube and adapted to engage a groove in said lens mount, a plate carried by said lens mount adjacent the groove and slidably adjustable to vary the effective width thereof, and retaining means for said plate to hold the same in adjusted position.

6. In a lens, the combination with a lens tube, of a lens mount removably secured thereto, a supplemental lens mount provided with a groove therein removably secured to said lens mount, securing means joining the lens tube and lens mount and supplemental lens mount and permitting disengagement of any one of them only by relative rotation thereof, a locking device carried by said lens tube and adapted to engage said groove in the supplemental lens mount whereby a single locking device is adapted to prevent removal of either the lens mount or the supplemental lens mount from the lens tube.

7. In a lens, the combination with a lens tube of a lens mount provided with a flange or projection thereon secured to said lens tube, a supplemental lens mount provided with a groove and secured to said lens mount and abutting said flange or projection whereby said lens mount may not be removed without removing said supplemental lens mount, a locking device on the lens tube adapted to engage the groove in said supplemental lens mount and prevent removal of either the lens mount or supplemental lens mount.

8. In a lens, the combination with a lens tube of a lens mount thereon which is provided with a groove in its periphery, a spring finger pivotally mounted on the lens tube to engage said groove to prevent relative rotation between the lens tube and the lens mount and adapted to be retained in a position disengaging said groove by the combined rotation about its pivot and flexure of the spring finger.

AUGUST KOEHLER.